US006630094B2

(12) United States Patent
Abramson et al.

(10) Patent No.: US 6,630,094 B2
(45) Date of Patent: Oct. 7, 2003

(54) FLEXIBLE PLASTIC HINGE HAVING TEAR RESISTANCE

(75) Inventors: Brian Abramson, Brampton (CA); Steven Ferguson, Toronto (CA)

(73) Assignee: Vidpro International, Inc., Carrollton, TX (US)

( * ) Notice: Subject to any disclaimer, the term of this patent is extended or adjusted under 35 U.S.C. 154(b) by 132 days.

(21) Appl. No.: 09/811,774

(22) Filed: Mar. 20, 2001

(65) Prior Publication Data

US 2002/0133905 A1 Sep. 26, 2002

(51) Int. Cl.[7] ............................ B29C 67/00; H05B 6/00

(52) U.S. Cl. ........................ 264/491; 264/479; 264/505; 16/225; 16/372; 29/11; 160/231.1; 160/231.2; 156/219; 156/272.2; 156/273.7

(58) Field of Search ........................ 16/225, 372; 29/11; 160/231.1, 231.2; 264/479, 491, 505; 428/174, 179, 180, 182, 183, 184; 156/209, 219, 272.2, 273.7, 380.6, 380.8

(56) References Cited

U.S. PATENT DOCUMENTS 3,454,694 A * 7/1969 Delaire et al. .............. 264/151
4,064,206 A * 12/1977 Seufert ........................ 220/837
4,482,417 A * 11/1984 Hulber et al. ............... 156/196
5,707,474 A * 1/1998 Andersen et al. ........... 156/257

* cited by examiner

*Primary Examiner*—Michael W. Ball
*Assistant Examiner*—John L. Goff
(74) *Attorney, Agent, or Firm*—Marks & Clerk

(57) ABSTRACT

A tear-resistant flexible hinge structure is placed between a pair of substantially rigid panels so as to permit the panels to be hinged one with respect to the other, where the flexible hinge is formed from a plastics material such as polyvinyl chloride. The hinge structure is formed under heat and pressure so as to comprise at least three parallel rows of alternating flat and raised portions, in staggered relationship. This causes a structure whereby any rip or tear which starts in the formed flexible hinge cannot continue because it will encounter a discontinuity in the configuration and thickness of the material, which precludes further propagation of the rip or tear. Typically, after the hinge structure has been formed, it is configured in a semi-circular cross section, re-heated and cooled, so as to set and have a memory in its closed configuration as opposed to the originally pre-formed flat, open configuration.

10 Claims, 1 Drawing Sheet

FLEXIBLE PLASTIC HINGE HAVING TEAR RESISTANCE

FIELD OF THE INVENTION

The present invention relates to flexible hinged structures, and particularly to flexible hinged structures which are placed between a pair of substantially rigid panels so that the panels may be hinged one to the other. The panels are formed of a substantially rigid material such as rigid polyvinyl chloride, and the hinge is formed of a flexible plastics material such as polyvinyl chloride. The hinge is configured, however, so as to be resistant to rips or tears, so that the pair of substantially rigid panels to which the flexible hinge has been sealed may be hingedly moved one with respect of the other with impunity.

BACKGROUND OF THE INVENTION

A co-pending application Ser. No. 09/789,807, filed Feb. 22, 2001, in the names of the inventors herein, teaches a structure which may be fitted to the front edges of shelves and the like, and to which a plurality of substantially rigid plastic pockets may be placed so as to provide pricing or other information with respect to items being displayed on the shelves. Typically, such structure is found in retail stores an the like, in association with household articles and other articles of all kinds, where the retailer wishes to provide pricing information, product specifications, etc.

In order to do so, the co-pending application teaches the structure whereby a plurality of like pockets may be fixed to the display structure on the front of the shelf, and the co-pending application notes that the pockets may be hinged one to another, or hinged directly to the display structure.

When the display pockets are hinged one to another, it is necessary that they shall be secured one to another by a flexible hinge which is sealed to each of the substantially rigid pockets or panels. However, at least two further criteria exist.

The first criterium is that the flexible hinge which secures the substantially rigid panels one to the other must not only be flexible, it must be strong and resistant to ripping or tearing. Unfortunately, soft and flexible plastics material is not, in and of itself, sufficiently resistant to ripping or tearing, and thus the use of soft and flexible plastics material as a hinge structure has not been recommended, until development of the present invention.

The other criterium is that, when in their rest position, the two substantially rigid panels to which the flexible hinge has been sealed should be contiguous one to the other, in back face to front face relationship of the one to the other. This requires that the flexible hinge that is between the substantially rigid panels shall have sufficient elastic memory that the panels will assume the contiguous, face-to-face relationship unless they are being held apart by a user who has hingedly moved one panel with respect to the other so as to view the additional information which is on the back face of one panel or the front face of the other panel which were previously hidden from view.

Thus, the need for a tear-resistant but flexible hinge structure arises. In response thereto, the present inventors have unexpectedly discovered that if a flexible plastic sheet material is reshaped over at least a selected portion thereof so as to provide a structure which essentially comprises a plurality of contiguous webs and ribs, or flat portions and raised portions, which are arranged in a staggered relationship, it is extremely difficult to rip or tear the flexible hinge structure beyond the discontinuity in the configuration of the flexible hinge structure. Thus, a rip or tear which has somehow been cause—such as by cutting—in the flexible hinge structure will not propagate along its length or across its width.

SUMMARY OF THE INVENTION

To that end, the present invention provides a tear-resistant, flexible hinge structure for placement between a pair of substantially rigid panels, wherein the flexible hinge structure is made from a flexible plastics sheet material having a first softening temperature, a second elastic memory loss temperature, and a third melting temperature. Of course, the second elastic memory loss temperature is higher than the softening temperature and lower than the melting temperature.

The flexible hinge structure is formed under heat and pressure in the flexible sheet material so as to comprise at least three parallel rows of alternating flat and raised portions, in staggered relationship. That configuration is such that each flat portion is contiguous to 2, 3, or 4 raised portions; and each raised portion is contiguous to 2, 3, or 4 flat portions.

The flexible hinge structure has opposed sides which are sealed one to each of the pair of substantially rigid panels.

The present invention is such that each of the alternating flat and raised portions in each row thereof has a width which is substantially equal to the width of all other flat and raised portions of that row.

Also, the length of each of the flat portions of each of the rows of alternating flat and raised portions is substantially equal to the length of all other flat portions; and likewise, the length of each of the raised portions of each of the rows of alternating flat and raised portions is substantially equal to the length of all the other raised portions.

The flat and raised portions of each row thereof are offset by one-half the length of a flat portion of each row, with respect to the flat and raised portions of each adjacent row thereof.

The thickness of each raised portion of the flexible hinge material, when the flexible hinge has been formed, is greater than the thickness of each flat portion of the flexible hinge material.

Typically, the flexible sheet material is polyvinyl chloride.

The plastic sheet material typically has an initial thickness in the range of 0.010 to 0.025 inches.

The width of each row is in the range of 0.050 to 0.075 inches; and the pitch of one flat portion and one raised portion is typically in the range of 0.0115 to 0.250 inches.

The softening temperature at which the sheet plastics material starts to lose its shape memory and starts to become flexible, is in the range of 175° F. to 200° F.

The full melting temperature at which the sheet plastics material has fully liquidized is in the range of 275° F. to 350° F.

The elastic loss memory at which the sheet plastics material has fully lost its elastic memory is in the range of 250° F. to 270° F.

In general, the flexible hinge structure of the present invention has been formed flat, but is re-formed and cooled in a semi-circular configuration crosswise of the flexible hinge structure.

Typically, there are between three and seven rows of alternating flat and raised portions, usually five rows.

Also, the hinge structure is generally sealed to the substantially rigid panels using radio frequency energy, and pressure, to each of the substantially rigid panels.

The present invention provides a method of making a tear-resistant, flexible hinge structure as described above. The method comprises the following steps:

a) a hard, flat metallic platen is provided.

b) a heat resistant, non-conductive barrier sheet is placed on the platen.

c) a metallic conductive die is provided, where the die has at least three parallel rows of alternating projections and intervening depressions therebetween. The rows of alternating projections and intervening depressions are arranged in staggered relationship, whereby each projection is contiguous to 2, 3, or 4 depressions, and each depression is contiguous to 2, 3, or 4 projections.

d) a pressure producing structure is provided over the metallic platen, together with control means for the pressure producing structure to advance the pressure producing structure towards the metallic platen, and to withdraw the pressure producing structure away from the metallic platen.

e) the metallic conductive die is secured to the pressure producing structure.

f) heating means are provided to heat the metallic conductive die to a predetermined temperature when it is in place on the pressure producing structure.

g) a source of radio frequency energy is provided, and it is connected between the metallic conductive die and the metallic platen.

h) at least a strip of flexible plastic sheet material from which the flexible hinge structure is to be formed, is placed on the barrier material.

i) the metallic conductive die is pre-heated to a temperature of 160° F. to 200° F.

j) the pre-heated metallic conductive die is advanced against the flexible plastics material so as to contact the same with pressure.

k) stop means are provided to assure that the pre-heated metallic conductive die does not advance so far as to contact the barrier material but that it advances to a distance away from the barrier material which is less than the original thickness of the flexible plastics material from which the flexible plastic hinge is being formed.

l) after step (j) has continued for a first predetermined period of time, the source of radio frequency energy is turned on for a second predetermined period of time.

m) after the source of radio frequency energy has been turned off following step (l), the metallic conductive die is permitted to remain in place for a third predetermined period of time.

n) the metallic conductive die is then withdrawn away from the barrier material, and the flexible plastics material, so as to reveal a formed flexible plastic hinge structure having at least three parallel rows of alternating flat and raised portions.

o) the formed flexible hinged structure is allowed to cool.

The source of radio frequency energy typically has a frequency which is in the range of 70 to 130 MHz.

The pressure which is produced by the pressure producing structure is typically in the range of 450 to 750 psi.

The first predetermined period of time is in the range of 5 to 30 seconds, the second predetermined period of time is in the range 2 to to 8 seconds, and the third predetermined period of time is in the range of 1 to 5 seconds.

The method of the present invention may also comprise the following step:

p) heating the formed flexible hinge structure to a temperature of 250° F. to 270° F., placing the formed flexible hinge structure in a semi-circular configuration crosswise of the flexible hinge structure while maintaining the temperature thereof in the range of 250° F. to 270° F., for a period of time in the range 20 to to 45 seconds, and then permitting the semi-circular formed configuration of the flexible plastic hinge to cool.

Of course, the present invention is carried out particularly when the plastics sheet material from which the flexible hinge structure has been formed has a thickness in the range of 0.010 to 0.025 inches.

The present invention may further comprise the step of:

q) during the steps (j) through (m) sealing the flexible hinge structure to the pair of substantially rigid panels by pressure and radio frequency energy.

In keeping with the present invention, each of the alternating projections and depressions in each row thereof on the metallic conductive die has a width which is substantially equal to the width of all other projections and depressions in that row.

The length of each of the projections of each of the rows of alternating projections and depressions is substantially equal to the length of all other projections.

The length of each of the depressions of each of the rows of alternating projections and depressions is substantially equal to the length of all other depressions.

The projections and intervening depressions of each row thereof are offset by one-half the length of a projection of each row with respect to the projections and intervening depressions of each adjacent row thereof.

Typically, the conductive metallic die comprises from three to seven contiguous brass strips, each having the alternating projections and intervening depressions formed therein.

The width of each of the contiguous brass strips is in the range of 0.050 to 0.075 inches.

Also, the pitch of one projection and one intervening depression is in the range of 0.115 to 0.250 inches.

The length of each depression which is formed in each brass strip of the metallic conductive die is typically in the range of 100% to 150% of the length of each projection.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF THE PREFERRED EMBODIMENTS

The novel features which are believed to be characteristic of the present invention, as to its structure, organization, use and method of operation, together with further objectives and advantages thereof, will be better understood from the following discussion.

Figure 1:
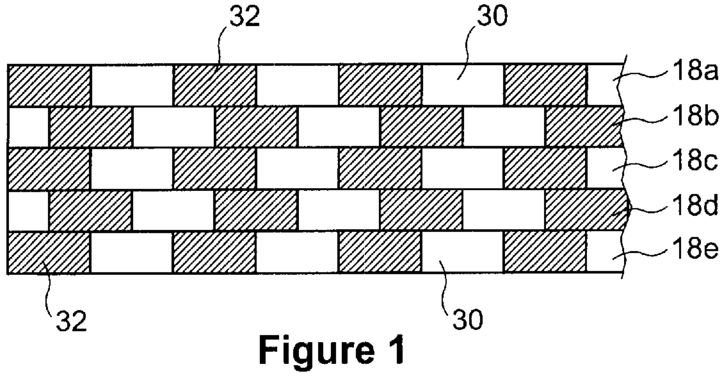
FIG. 1 is a plan view which represents either the structure of a tear-resistant flexible hinge in keeping with the present invention, or the plan view of the die which forms that tear-resistant flexible hinge structure.
Figure 3:
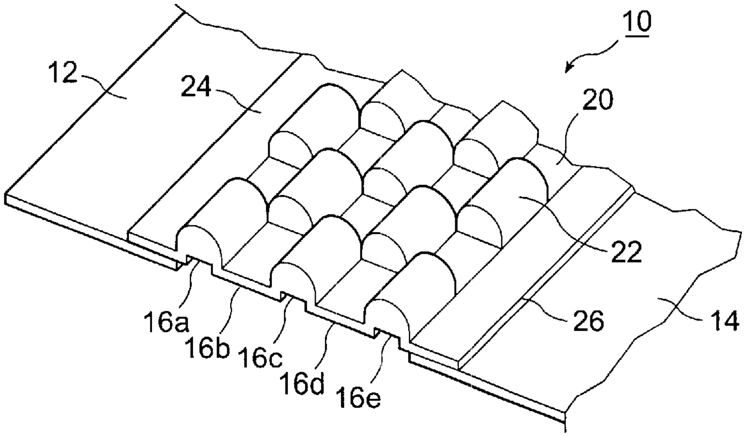
FIG. 3 is a perspective view of a formed tear-resistant, flexible hinge structure of the present invention, when it is in its flat configuration as formed.

Referring first to FIGS. 1 and 3, a typical tear-resistant, flexible hinge structure in keeping with the present invention is shown—at least in part. The flexible hinge structure 10 is intended for placement between a pair of substantially rigid panels 12 and 14. Those panels may, in fact, be display pockets of the sort that are discussed in the co-pending application noted above. The display pockets being such that a sheet of paper or thin cardboard, or two such sheets in back-to-back relationship, may be placed in the pocket so as to convey information to the reader. Of course, the panels are double-sided, so that information on the front face and back face of each of the panels 12 and 14 differs from the other information, as will be determined such as by the retailer who employs the display system having the flexible hinge structures of the present invention.

The flexible plastics sheet material from which the tear-resistant, flexible hinge structure of the present invention is made, is such that it has a first softening temperature, a second elastic memory loss temperature, and a third melting temperature. Of course, the first softening temperature is the lowest, and the third melting temperature is the highest. Typical materials and temperatures are discussed hereafter.

As will also be discussed hereafter, the flexible hinge structure of the present invention is formed under heat and pressure in the flexible sheet plastics material so as to comprise at least three parallel rows of alternating flat and raised portions, in staggered relationship. FIGS. 1 and 3 each show five rows. Referring particularly to FIG. 3, those rows are shown at 16*a*, 16*b*, 16*c*, 16*d*, and 16*e*; and at 18*a*, 18*b*, 18*c*, 18*d*, and 18*e* in FIG. 1.

Again referring to FIG. 3, it will be seen that each flat portion 20 is contiguous to at least two raised portions, being those at the ends; those at the sides are contiguous to three raised portions 22; and the remaining flat portions 20 are contiguous to four raised portions 22. The same holds true in respect of the raised portions 22, each of which is contiguous to 2, 3, to or 4 flat portions 20.

FIG. 1 shows areas 30, any of which may be a flat portion 20 when viewing the tear-resistant, flexible hinge structure 10 in plan view; and likewise, any area 32 may be a raised portion 22 of the flexible hinge structure 10 when seen in plan view. However, as discussed hereafter, the areas 30 and 32 may also represent depressions and projections on individual die elements, such as that seen in FIG. 2 and as described hereafter.

The flexible hinge structure 10 has opposed sides 24 and 26, which are sealed to the respective substantially rigid panels 12 and 14.

It will be seen from FIGS. 1 and 3, particular, that each of the alternating flat and raised portions 20, 22 (30, 32) in each row 16*a* . . . 16*e* (18*a* . . . 18*e*) has a width which is substantially equal to the width of all other flat and raised portions of that row.

Likewise, it will be seen in FIGS. 1 and 3 that the length of each of the flat portions 20 (30) of each of the rows of alternating flat and raised portions is substantially equal to the length of all other flat portions 20 (30); and, of course, the length of each of the raised portions 22 (32) of each of the rows of alternating flat and raised portions 16*a* . . . 16*e* (18*a* . . . 18*e*) is substantially equal to the length of all the other raised portions 22 (32).

It is also seen quite clearly in each of FIGS. 1 and 3 that the flat and raised portions 20, 22 (30, 32) of each row thereof are offset by one-half of the length of a flat portion 20 (30) with respect to the flat and raised portions 20, 22 (30, 32) of each adjacent row thereof.

As will be explained hereafter, but as can be seen in FIG. 3, the thickness of the material of the flexible hinge structure at each of the raised portions 22 is greater than the thickness of the material of the flexible hinge structure at each flat portion 20 thereof. Indeed, in some instances, the underside of the flexible hinge structure 10 is somewhat dimpled but otherwise has a generally slightly rough or not quite flat appearance, notwithstanding that the upper side of the formed flexible hinge structure has a very distinct pattern formed in it, as discussed and as can be seen in FIG. 3.

It has been noted that the typical material from which the flexible hinge structures that exhibit rip or tear resistance, in keeping with the present invention, have been formed is polyvinyl chloride. That material typically has an initial thickness which is in the range of 0.010 inches to 0.025 inches.

A specific material in respect of which great experimental success has been noted by the present inventors is a flexible polyvinyl chloride material having a thickness of approximately 0.016 inches, and it is a PVC material which is known in the plastics industry by the designations “four hand” or “very soft”. Such PVC materials are of the sort which have no additional plasticizer; and although plasticizers are normally employed to impart softness or flexibility to plastics materials, the formulations of suitable “four hand” or “very soft” PVC sheet materials of the sort that have been employed herein provides very significant softness or flexibility without the necessity for the employment of additional plasticizers.

The width of each row 16*a* . . . 16*e* of alternate flat portions 20 and raised portions 22, having regard to FIG. 3, is typically in the range of 0.050 inches to 0.075 inches. A common width that has been employed is 0.060 inches.

Also, the pitch of one flat portion 20 (30) and one raised portion 22 (32), in keeping with the present invention, is typically in the range of 0.0115 inches to 0.250 inches. Once again, a pitch of about 0.140 inches has been found to be quite effective.

Typically, the softening temperature at which the sheet plastics material of the formed flexible hinge structure of the present invention will start to loose its shape memory and start to become flowable, is in the range of 175° F. to 200° F. The full melting temperature at which the sheet plastics material has fully liquidized is in the range of 275° F. to 300° F. Also, the elastic loss memory at which the sheet plastic material has fully lost its elastic memory is in the range of 250° F to 270° F. These factors are important for the reasons noted hereafter.

Particularly, as will be seen hereafter, a tear-resistant, flexible hinge structure in keeping with the present invention is formed flat, but because of the necessary criterium that it shall have a closed configuration, it is re-formed and cooled in a semi-circular configuration crosswise of the flexible hinge structure. As will be seen hereafter, the temperature at which that re-forming step takes place is in the range of 250° F. to 270° F., so as to effectively destroy any previous elastic memory—that of being flat—and re-set the elastic memory to the desired semi-circular configuration.

In general, while there may be between three and seven rows 16*a* . . . 16*e* (18*a* . . . 18*e*) in a flexible hinge structure in keeping with the present invention, it has been found that five rows is appropriate. It should also be noted that the flexible hinge structure 10 is typically heat sealed to the rigid plastic panels 12 and 14 using the same pressure and radio frequency energy by which the structure shown in FIG. 3 has been formed, as described hereafter.

The purpose of forming the hinge structure in the manner shown and described herein is to yield a new shape which comprises interspersed thin surfaces and thick lines or protrusions. Typically, as described herein, the shape of each of those flat portions 20 (30) and the shape of each of the raised portions 22 (32) when seen in plan view, is rectangular. However, it will be obvious to those skilled in the art that other shapes such as oblong triangle, hexagon, or circles, can be employed to achieve the same purpose. Specifically, each thin surface or portion 20 (30) is such that it must be individually broken for a rip or tear to continue to propagate, and that is not possible due to the intervention of the thick raised portions 22 (32) between them.

Thus, any rip, tear, or crack that may occur must attempt to change its direction in order to continue or propagate, and due to the staggered relationship of the flat portions and raised portions, that is not possible.

Figure 2:
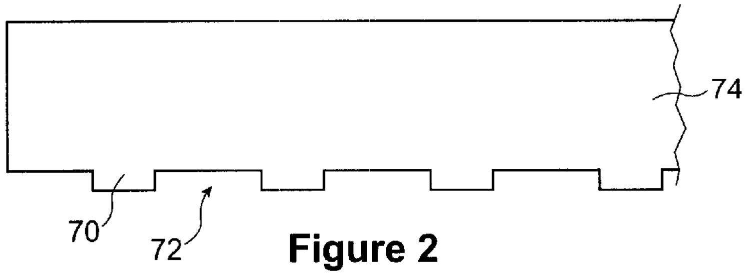
FIG. 2 is the elevation of a typical die element, essentially to the same scale as FIG. 1.

The present invention provides an apparatus and method by which the tear resistant, flexible hinge structures of the present invention may be made. To achieve that, an apparatus is shown schematically in FIG. 4, and an elevation of a typical die element is seen in FIG. 2—much to the same scale as the plan view of FIG. 1 if the plan view of FIG. 1 is considered to be that of the hinge structure 10. The reasons for that are explained hereafter.

The apparatus includes a hard, flat metallic platen 50 on which a heat-resistant, non-conductive barrier sheet 52 is placed. The metallic conductive die is provided, shown at 54. A portion of a single metallic die element 74 is shown in FIG. 2.

The metallic conductive die 54 has at least three parallel rows of alternating projections 70 and intervening depressions 72 therebetween (see FIG. 2) in which the projections and intervening depressions may also be considered schematically to be represented at 32 and 30, respectively, in FIG. 1. In any event, there is a plurality of rows of alternating projections 70 and intervening depressions 72 which are arranged in staggered relationship as seen in FIG. 1, whereby each projection is contiguous to 2, 3, to or 4 depressions, and each depression is contiguous to 2, 3, to or 4 projections. Those relationships have been discussed above, and are evident by inspection of FIG. 1.

Figure 4:
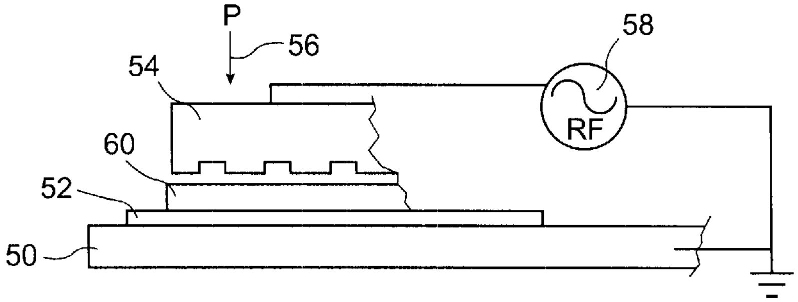
FIG. 4 is a schematic cross section of an apparatus on which the tear-resistant, flexible hinge structures of the present invention are initially formed.

A pressure producing structure is provided, which will produce a pressure indicated at 56 in FIG. 4. Control means (not shown) are also provided, and are well known to those skilled in the art. The control means are intended to advance the pressure producing structure towards the metallic platen 50 in the direction of arrow 56, and to withdraw the pressure producing structure away from the metallic platen 50.

The metallic conductive die 54 is secured to the pressure producing structure, and means are provided (not shown) which will heat the metallic conductive die 54 to a predetermined temperature when it is in place on the pressure producing structure. Typically, those heating means may be a thermostatically controlled electrical heating element.

A source of radio frequency energy 58 is provided, and it is connected between the metallic conductive die 54 and the metallic platen 50, as shown. Typically, the connection at the metallic platen 50 is grounded.

The strip of flexible plastic sheet material—the work piece 60—is placed on the barrier material 52.

Accordingly, what has been described up to now is effectively steps (a) through (h) of the method which has been detailed above.

Following on with the method, step (i) calls for the metallic conductive die 54 to be pre-heated to a temperature in the range of 160° F. to 200° F.–typically, 175° F. It will be noted that the temperature is adjusted to the range at which the sheet plastics material of the work piece 60 will begin to lose its shape memory and start to become flowable.

The metallic conductive die 54 is advanced, in keeping with step (j), towards the flexible plastics material 60 so as to contact the same with pressure. Stop means are provided, as noted in step (k) detailed above, which assures that the pre-heated metallic conductive die 54 will not advance so far as to contact the barrier material 54, but that it will advance sufficiently far so that the projections 70 of the metallic conductive die 54 will be a distance away from the barrier material 52 which is less than the original thickness of the flexible plastics material 60.

The pre-heated metallic conductive die 54 is maintained in position for a period of 5 to 30 seconds—typically, 15 seconds—after which the source of radio frequency energy 58 is turned on. The time period for which the radio frequency energy 58 is turned on is in the range of 2 to 8 seconds, and typically that is 2 to 5 seconds. These matters are described in step (l), above.

Then, in keeping with step (m), after the source of radio frequency energy 58 has been turned off, the metallic conductive die 54 is permitted to remain in place for a third predetermined period of time of 1 to 5 seconds—typically, about 2 seconds.

The pressure is then relieved, in keeping with step (n), and the metallic conductive die 54 is withdrawn away from the barrier material 52 and the flexible plastics material 60 so as to reveal a formed flexible plastics hinge structure 10 which has at least three parallel rows of alternating flat and raised portions 20, 22 (30, 32). The number of rows of flat and raised portions is, of course, the same as the number of brass elements 74 that have been used in the conductive metallic die 54.

Finally, in keeping with step (o), the formed flexible hinge structure is permitted to cool.

Of course, in keeping with another step that serves the criterium of destroying the elastic memory of the flexible hinge 10 in its flat condition as shown in FIG. 3, step (p) might be carried out. In that step, the formed flexible hinged structure 10 is again heated to a temperature of 250° F. to 270° F., and it is placed in a semi-circular configuration crosswise of the flexible hinge structure 10 while maintaining the temperature thereof in the range of 250° F. to 270° F. for a period of time in the range 20 seconds to 45 seconds—typically, 20 seconds. The semi-circular formed configuration of the flexible plastic hinge 10 is then permitted to cool, thereby re-setting the elastic memory thereof to the semi-circular configuration.

A typical frequency range for the source of radio frequency energy 58 is in the range of 70 MHz to 130 MHz; and a typical pressure at which the pressure producing structure—typically, an hydraulic cylinder—is forced against the work piece 60, is in the range of 450 psi to 750 psi.

During the heating and pressure steps, the following takes place:

First, as radio frequency energy is applied to the metallic conductive die 54, due to the electrical connections that are made and are as shown in FIG. 4, essentially what occurs is that an RF capacitor is formed between the metallic conductive die 54 and the metallic platen 50. RF energy is built up, and it then burst from the die towards the platen, through the plastics material of the work piece 60. At that time, the plastics material is heated substantially to its melting point or above, but in a very localized condition. The molten or semi-molten plastics material flows, and as pressure is exerted downwardly against the projections 70, the plastics material flows or wicks into the intervening depressions 72. Thus, the thickness of the flat portions 20, as seen in FIG. 3, is less than the thickness of the material of the flexible plastic sheet material from which the flexible hinge structure 10 has been formed, and the thickness of the raised portions 22 is considerably greater than the thickness of either the flat portions 20 or the initial thickness of the sheet plastics material from which the hinge structure 10 has been formed.

When the flexible hinge structure is post-formed into a semi-circular configuration, as described above with respect of step (p), that step undertaken in practical manner by heating the material as discussed by pressing it against the flat plate which has heated to 275° F. and maintaining it in that manner for a period 20 to 30 seconds. That time is not sufficient to cause significant melting, but it is sufficient to destroy and re-set the elastic memory.

Of course, typically the flexible hinge structure 10 is sealed to the substantially rigid panels 12 and 14 at the same time and using the same pressure and radio frequency energy, as described above.

Finally, it has been noted that a configuration of the flexible hinge structure 10 whereby the length of each of the flat portions 20 (30) and the raised portions 22 (32) are substantially equal is achieved by having the length of the projections 70 and the intervening depressions 72 of unequal length. Typically, the length of the depressions 72 is in the range of 100% to 150% of the length of the projections 70, usually, about 120% to 130%. The reason appears to be that the locally molten flexible material is still quite viscous, and while it tends to flow and indeed wick to some extent into the depressions 72, there is not an exact conformity of the molten or semi-molten plastics material to the configuration of the projections and depressions 70, 72 of the metallic conductive die 54.

There has been described a tear-resistant, flexible hinge structure which may be placed between a pair of substantially rigid panels to allow them to be hingedly connected one to the other, but where the flexible hinge structure resists ripping or tearing, and will not propagate a rip or tear if it has in some manner begun. There has also been described an apparatus, and particularly the method, by which the flexible hinge structure is manufactured.

Other modifications, alterations, and amendments to the flexible hinge structure and the method for its manufacture may be made by those skilled in the art, without departing from the spirit and scope of the appended claims.

Other modifications and alterations may be used in the design and manufacture of the apparatus of the present invention without departing from the spirit and scope of the accompanying claims.

Moreover, the word "substantially" when used with an adjective or adverb is intended to enhance the scope of the particular characteristic; e.g., substantially planar is intended to mean planar, nearly planar and/or exhibiting characteristics associated with a planar element.

For example, substantially rigid means exhibiting the characteristic of rigidity, particularly as that term is understood in respect of the plastics industry. Substantially equal is meant to indicate the characteristics of equality, or of being nearly the same size, without a requirement for exactness thereof.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

What is claimed is:

1. A method of making a tear-resistant, flexible hinge structure comprising the steps of:

a) providing a hard, flat metallic platen;

b) placing a heat resistant, non-conductive barrier sheet on said platen;

c) providing a metallic conductive die having at least three parallel rows of alternating projections and intervening depression therebetween, wherein said rows of alternating projections and intervening depressions are arranged in staggered relationship whereby each projection is contiguous to 2, 3, to or 4 depressions, and each depression is contiguous to 2, 3, to or 4 projections;

d) providing a pressure producing structure over said metallic platen, and control means therefor to advance said pressure producing structure towards said metallic platen and to withdraw said pressure producing structure away from said metallic platen;

e) securing said metallic conductive die to said pressure producing structure;

f) providing heating means to heat said metallic conductive die to a predetermined temperature when it is in place on said pressure producing structure;

g) providing a source of radio frequency energy, and connecting it between said metallic conductive die and said metallic platen;

h) placing at least a strip of flexible plastics sheet material from which said flexible hinge structure is to be formed, on said barrier material;

i) pre-heating said metallic conductive die to a temperature of 160° F. to 200° F.;

j) advancing said pre-heated metallic conductive die against said flexible plastics material so as to contact the same with pressure;

k) providing stop means to assure that said pre-heated metallic conductive die does not advance so far as to contact said barrier material but advances to a distance away from said barrier material which is less than the original thickness of said flexible plastics material;

l) after step (j) has continued for a first predetermined period of time, turning on said source of radio frequency energy for a second predetermined period of time;

m) after said source of radio frequency energy has been turned off following step (l), permitting said metallic conductive die to remain in place for a third predetermined period of time;

n) withdrawing said metallic conductive die away from said barrier material and said flexible plastics material so as to reveal a formed flexible plastics hinge structure having at least three parallel rows of alternating flat and raised portions; and o) permitting said formed flexible hinge structure to cool.

2. The method of claim 1, wherein said source of radio frequency energy has a frequency in the range of 70 to 130 MHz.

3. The method of claim 1, wherein the pressure produced by said pressure producing structure is in the range of 450 to 750 psi.

4. The method of claim 1, wherein said first predetermined period of time is in the range of 5 to 30 seconds, wherein said second predetermined period of time is in the range 2 to to 8 seconds, and wherein said third predetermined period of time is in the range of 1 to 5 seconds.

5. The method of claim 1, followed by the additional step of:

p) heating said formed flexible hinge structure to a temperature of 250° F. to 270° F., placing said formed flexible hinge structure in a semi-circular configuration crosswise of said flexible hinge structure while maintaining the temperature thereof in the range of 250° F. to 270° F. for a period of time in the range 20 to to 45 seconds, and permitting the semi-circular formed configuration of the flexible plastic hinge to cool.

6. The method of claim 1, wherein said plastics sheet material has an initial thickness in the range of 0.010 to 0.025 inches.

7. The method of claim 1, further comprising the step of:

q) during steps (j) through (m), sealing said flexible hinge structure to a pair of substantially rigid panels by pressure and radio frequency energy.

8. The method of claim 1, wherein each of said alternating projections and depressions in each row thereof on said metallic conductive die has a width which is substantially equal to the width of all other projections and depressions in that row;

wherein the length of each of said projections of each of said rows of alternating projections and depressions is substantially equal to the length of all other projections;

wherein the length of each of said depressions of each of said rows of alternating projections and depressions is substantially equal to the length of all other depressions; and wherein the projections and depressions of each row thereof are offset by one-half the length of a projection of each row with respect to the projections and depressions of each adjacent row thereof.

9. The method of claim 8, where said conductive metallic die comprises from three to seven contiguous brass strips, each having said alternating projections and intervening depressions formed therein;

wherein the width of each of said contiguous brass strips is in the range of 0.050 to 0.075 inches; and wherein the pitch of one projection and one intervening depression is in the range of 0.0115 to 0.250 inches.

10. The method of claim 1, wherein the length of each depression formed in each brass strip of said metallic conductive die is in the range of 100% to 150% of the length of each projection.

* * * * *